United States Patent [19]

Schmidt et al.

[11] 4,402,754

[45] Sep. 6, 1983

[54] PROCESS OF PRODUCING CEMENT CLINKER

[75] Inventors: Hans-Werner Schmidt, Frankfurt am Main; Hans Beisswenger, Bad Soden; Lothar Reh, Frankfurt am Main, all of Fed. Rep. of Germany; Albert Folliot, 8, rue Darcel, F 92100 Boulogne; Maurice P. Iard, Chalon-sur-Saone, both of France

[73] Assignees: Creusot-Loire Enterprises, Suresnes; Lafarge Coppee, Paris; Albert Folliot, Boulogne, all of France; Metallgesellschaft, Frankfurt am Main, Fed. Rep. of Germany

[21] Appl. No.: 349,878

[22] Filed: Feb. 18, 1982

[30] Foreign Application Priority Data

Feb. 28, 1981 [DE] Fed. Rep. of Germany ....... 3107711

[51] Int. Cl.³ .............................................. C04B 7/44
[52] U.S. Cl. ..................... 106/100; 432/15
[58] Field of Search ........................ 106/100; 432/15

[56] References Cited

U.S. PATENT DOCUMENTS 3,964,922  6/1976  Nishida et al. ...................... 106/100
4,111,158  9/1978  Reh et al. .............................. 432/58

FOREIGN PATENT DOCUMENTS 2712238 10/1978  Fed. Rep. of Germany ...... 106/100
2200217  4/1974  France .................................. 106/100
2221416 10/1974  France .................................. 106/100
2275418  1/1976  France .................................. 106/100

*Primary Examiner*—James Poer
*Attorney, Agent, or Firm*—Felfe & Lynch

[57] ABSTRACT

Cement clinker is produced in that raw cement powder is preheated in a suspension-type heat exchanger and is de-acidified in a precalcining apparatus and clinkered in a fluidized bed and the clinker is subsequently cooled. An de-acidification of at least 95% is effected at a temperature above 85° C. in a circulation system comprising a fluidized bed reactor, a cyclone separator and a recycling duct. The carbonaceous fuel required for the calcining and clinkering processes is fed in an amount of at least 65% (related to the total heat requirement) to the de-acidifying fluidized bed reactor and in an amount of at least 10% (related to the total heat requirement) to the clinkering fluidized bed reactor. The fuel supplied to the fluidizing bed reactor is burnt near stoichiometrically in two stages with fluidizing gas and secondary gas. The ratios of the rates and volumes of fluidizing gas to secondary gas are so selected that a means suspension density of 100 to 300 kg/m³ is maintained in the zone between the inlet for fluidizing gas and the inlet for fluidizing gas, and a mean suspension density of 5 to 30 kg/m³ is maintained above the inlet for secondary gas.

10 Claims, 2 Drawing Figures

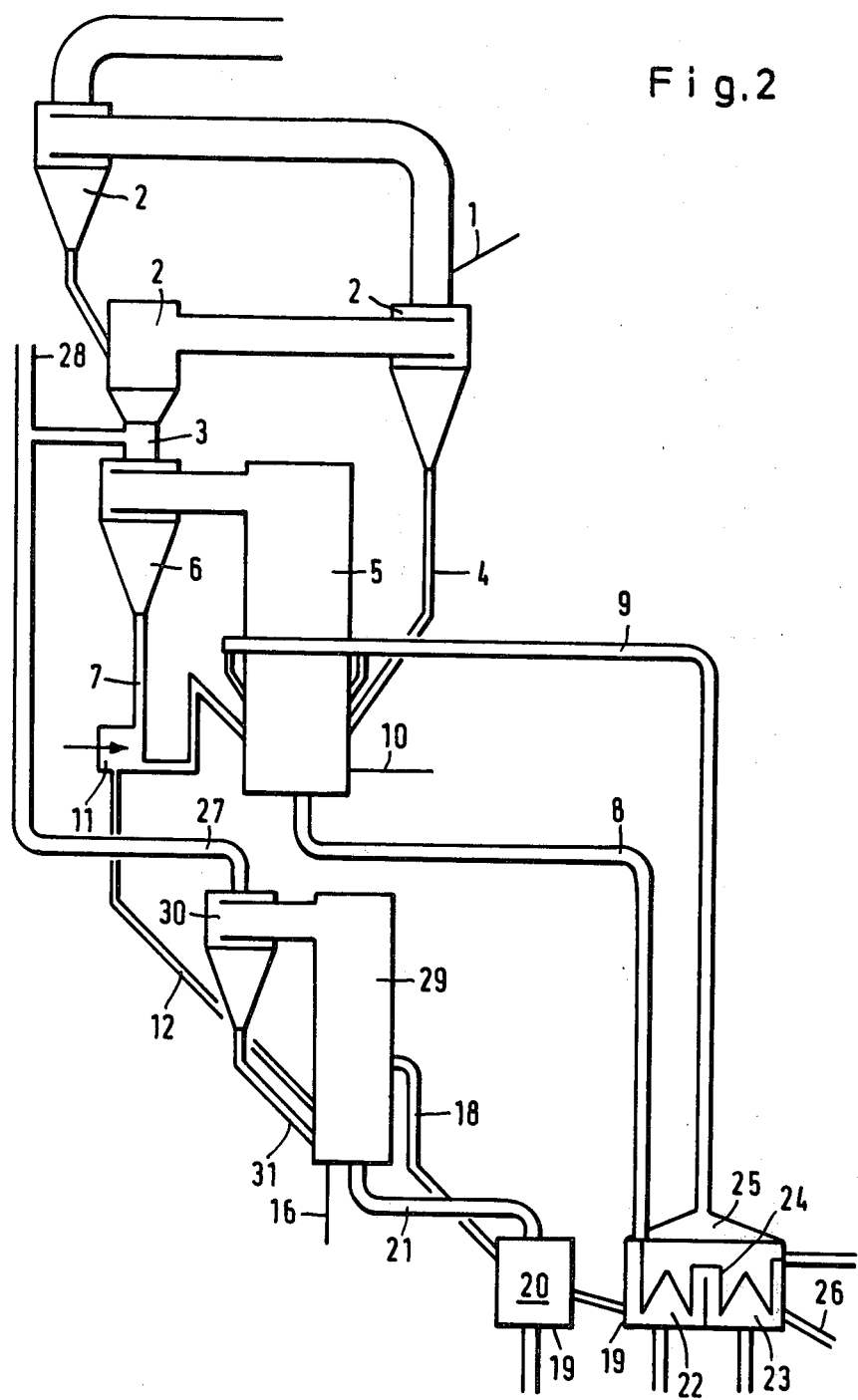

PROCESS OF PRODUCING CEMENT CLINKER

BACKGROUND OF THE INVENTION

1. Field of the Invention

This invention relates to a process of producing cement clinker comprising preheating the raw cement powder in a suspension-type heat exchanger, de-acidifying in a precalcining system, clinkering in a fluidized bed, and subsequently cooling the clinker.

2. Discussion of Prior Art

In the production of cement clinker it is generally usual to remove mechanically and chemically bound water from raw cement powder, to de-acidify the raw cement powder to a certain degree in a suspension-type heat exchanger and to use a rotary kiln for the further de-acidification and the clinkering.

Because a major part of the de-acidification is effected in the rotary kiln in that practice, it has the disadvantage that particularly for high throughput rates the rotary kiln must have large dimensions, which are not desirable from the aspect of plant engineering.

For this reason numerous efforts have been made to deacidify the raw cement powder as far as possible before it enters the rotary kiln. For this purpose, e.g., fuel has been fed separately to the lowermost stage of the suspension-type heat exchanger in order to effect a further heating a de-acidification of the raw material (German Patent Publication 23 24 565). But the effect of that practice is limited because the raw material is subjected to the elevated temperature only for a short time.

A further development for in the production of cement clinker calls for de-acidifying the raw material as far as possible in a separate unit, which is connected between the suspension-type heat exchanger and the rotary kiln and may consist of a heated pneumatic conveyor for feeding the raw material from the suspension-type heat exchanger to a cyclone, which precedes the rotary kiln (French Pat. No. 2,197,827), or of a fluidized bed reactor, from which the raw material is charged into the rotary kiln through a smoke chamber and a cyclone (German Pat. No. 23 44 094). In both cases it is difficult to control the residence time which is required for an adequate de-acidification, particularly because the grading of the raw material usually varies. It is also difficult to discharge the coarse particles.

In a process of burning raw cement powder in a plant comprising a suspension-type heat exchanger and a precalcining unit it is also known to burn the material to form clinker in a fluidized bed (European Opened Application 00 00 739). That practice has the disadvantage that it is virtually impossible to maintain in the clinkering stage the uniform residence time which is essential for a cement of high quality.

It is an object of the invention to provide a process in which the disadvantages of the known processes, particularly of those described hereinbefore are avoided, which permits a virtually complete de-acidification of the raw cement powder before it is charged to the fluidized bed furnace and which can be carried out with a reasonable structural expenditure.

SUMMARY OF THE INVENTION

This object is accomplished in that the process of the kind described first hereinbefore is carried out in accordance with the invention in such a manner that A. a de-acidification of at least 95% is effected at a temperature above 850° C. in a circulation system comprising a fluidized bed reactor, a cyclone separator and a recycling duct, B. the fuel required for the calcining and clinkering process is fed in an amount of at least 65% (related to the total heat requirement) to the de-acidifying fluidized bed reactor and in an amount of at least 10% (related to the total heat requirement) to a clinkering fluidized bed reactor to which the de-acidified material from the de-acidification fluidized bed reactor is introduced;

C. the fuel supplied to the de-acidifying fluidized bed reactor is near stoichiometrically burned in two combustion stages with at least two partial streams of oxygen-containing gas, one of said stream is supplied as fluidizing gas and the other is supplied on a higher level as secondary gas; the ratio of the rates and volumes of fluidizing gas to secondary gas is maintained in the range from 1:1 to 1:10 so that a mean suspension density of 100 to 300 kg/m$^3$ is maintained in the zone between the inlet for fluidizing gas and the inlet for secondary gas, D. and a mean suspension density of 5 to 30 kg/m$^3$ is maintained above the inlet for secondary gas.

Whereas in an orthodox fluidized bed, a dense phase is separated by a distinct change in density from the overlying gas space, the fluidized state in the fluidized bed reactor of the circulation system comprising the fluidized bed reactor, cyclone separator and recycling duct is distinguished by states of distribution having no distinct interface. There is no sudden change in density between a dense phase and the overlying dust space but the solids concentration in the reactor decreases continuously from bottom to top.

German Pat. No. 17 67 628 describes a process of carrying out endothermic processes, i.e., for burning certain kinds of raw cement powder, wherein the material to be treated in the process is pre-dehydrated and/or heated in a multistage suspension-type exchanger. This material is then fed through a separator to a fluidized bed furnace, with which a recycling cyclone is associated, and the reaction product is finally withdrawn from the cycle comprising the fluidized-bed furnace and the recycling cyclone and fed to a multistage fluidized-bed cooler, so that a so-called circulating fluidized bed is employed. However, in that process the de-acidification and clinkering are carried out in a common fluidized bed. In the specific application this has the disadvantage that the de-acidification is effected at the high clinkering temperatures, which would not be required for the de-acidification. As a result exhaust gases at high temperature are obtained at high volumetric rates and the fuel consumption is correspondingly high. Another disadvantage encountered with various starting materials resides in the observation that the quality of the product is inferior to that obtained when the de-acidification and clinkering are carried out in two separate stages.

If the operating conditions of the process according to the invention are defined with the aid of the Froude and Archimedes numbers, the following ranges are obtained:

$$0.5 \leq \tfrac{3}{4} \times F_r^2 \times \frac{\rho_g}{\rho_k - \rho_g} \leq 50$$

or $$0.01 \leq Ar \leq 10$$

wherein $$Ar = \frac{d_k^3 \times g(\rho_k - \rho_g)}{\rho_g \times \nu^2}$$

$$F_r^2 = \frac{u^2}{g \times d_k}$$

u = relative velocity of gas in m/sec
Ar = Archimedes' number
$\rho_g$ = density of gas in kg/m$^3$
$\rho_k$ = density of solid particle in kg/m$^3$
$d_k$ = diameter of spherical particle in m
$\nu$ = kinematic viscosity in m$^2$/sec
g = acceleration due to gravity in m/sec$^2$
$F_r$ = Frounde number Most of the fuel to be supplied to the de-acidifying fluidized bed reactor is fed below the secondary gas inlet. This measure and the division of all oxygen-containing gases required for the combustion into two partial streams, which are fed on different levels, result in a soft combustion in two stages so that hot spots in the fluidized bed reactor are avoided. In addition, the formation of nitrogen oxides is highly suppressed, e.g., to values below 100 ppm.

The fluidized bed reactor may be rectangular, square or circular in cross-section. The lower portion of the fluidized bed reactor may be conical. This is particularly desirable if the reactor is large in cross-section.

The gas velocities which are obtained in the fluidized bed reactor above the secondary gas inlet under normal pressure are usually above 5 m/sec and may be as high as 15 m/sec.

The fluidized bed reactor should have such a ratio of diameter to height that gas residence times of 0.5 to 8.0 seconds, preferably 1 to 4 seconds, are obtained.

The secondary gas may be fed at a plurality of levels or at a single level. In either case it can be fed through a plurality of inlet openings. The secondary gas is fed at a level of at least 1 meter above the inlet for the fluidizing gas. Generally, the secondary gas is fed to the fluidized bed reactor at a point in the lower three tenths (30%) of the height of the fluidized bed reactor. If the secondary gas is fed at a plurality of levels, it is preferred that the uppermost level not be at a point above a height of 30% of the overall fluidized bed reactor height, measured from the bottom of the reactor. That height provides for a sufficiently large space for the first combustion stage, which effects an almost complete reaction between the carbonaceous material and the oxygen-containing fluidizing gas and ensures that in the upper reaction space, which is disposed above the secondary gas inlet, the oxygen will be reacted in accordance with the selected stoichiometric ratio.

The fuel may consist of fuel oil, coal, particularly brown coal (lignite), coal having a high ash content, such as washery refuse, or of oil shale or, if desired, domestic garbage. The use of a fuel having a high heating value is recommendable in the clinkering stage.

In connection with the division of the fuel it is particularly desirable to supply the de-acidifying fluidized bed reactor with 70 to 85% (related to the total heat requirement) of the fuel required for the calcining and clinkering processes and to supply the clinkering fluidized bed reactor with 15 to 30% (related to the total heat requirement) of said fuel. The fuel fed to the clinkering fluidized bed reactor serves mainly to heat the stream which leaves the de-acidifying fluidized bed reactor and to compensate the radiation losses.

In order to subject the raw material to a de-acidification of at least 95%, the residence time of the raw material should preferably amount to at least 3 to 15 minutes, particularly to 5 to 10 minutes. At the temperature to be maintained in the circulation system, the temperature lies preferably in the range from 950° to 1150° C. This residence time permits a successful processing of virtually all raw materials even if they have a large particle size range and contain coarse particles. Owing to the constant temperature in the circulation system and the defined residence times of the solids, the de-acidified product is highly homogeneous.

If a solid carbonaceous fuel is to be used, the solids should have a median particle diameter below 500 $\mu$m, preferably between 100 and 300 $\mu$m. The median diameter is defined in that the particle size of 50% by weight of the solids is larger and the particle size of 50% by weight of the solids is smaller than said median particle size.

The calcined raw cement powder can be clinkered in an orthodox fluidized bed at controlled velocities of 2 to 4 m/sec of the fluidizing gas.

It is particularly desirable to use a circulating fluidized bed also in the clinkering stage. Different from the circulating fluidized bed used in the de-acidifying stage, any circulating fluidized bed used in the clinkering stage should not be supplied with secondary gas. The average suspension density over the entire height of the reactor should suitably amount to 100 to 300 kg/m$^3$. The calcine should preferably be fed to the reactor on the lowest possible level or even into the fluidizing gas supply duct. This applies also to the supply of fuel.

The gas velocity in the circulating fluidized bed should amount to about 2 to 6 m/sec and the median particle diameter of the clinker should amount to 200 to 500 $\mu$m.

The cooling of the clinker is preferably combined with the heating of oxygen-containing gas, at least part of which is supplied to the calcining and clinkering processes. The cooling may be effected by direct-contact cooling and by indirect cooling.

The coolers may preferably consist of fluidized bed coolers, particularly of such coolers comprising a plurality of chambers, which may be separate or structurally combined in a unit. The stream of oxygen-containing gas which is at the highest temperature because it has been heated in the first chamber is suitably fed as fluidizing gas to the clinkering fluidized bed reactor.

The other heated gas streams obtained in the cooling stage are suitably supplied to the de-acidifying fluidized bed. The oxygen-containing gases which have been indirectly heated are preferably used as fluidizing gas and the oxygen-containing gases heated by direct contact are preferably used as secondary gas. Any remaining gas stream may be fed to the suspension-type heat exchanger.

The entire exhaust gas from the de-acidifying circulation system is usually supplied to the suspension-type heat exchanger. The exhaust gas from the clinkering fluidized bed reactor may also be fed to the suspension-type heat exchanger. But if the raw cement powder has relatively high contents of volatilizable alkalies, a smaller or larger part of said exhaust gas, depending on its alkali content, should by-pass the suspension type heat exchanger. A by-passing of 100% of said exhaust gases may be required in an extreme case, if the alkali content is particularly high.

The process according to the invention affords numerous important advantages. For instance, the residence time of the raw material in the de-acidifying circulation system can be very precisely controlled so that there is virtually no fluctuation in the degree to which the raw material is de-acidified. Additionally, the temperature in the circulation system is virtually constant and temperature peaks which might result in volatilizing reactions are avoided. Such volatilizing reactions are not desired in that stage. The circulation system ensures also a constant supply of solids to the clinkering fluidized bed furnace so that a clinker of high quality can be obtained. The de-acidification to a high degree effected in the de-acidifying circulation system relieves the clinkering fluidized bed furnace, where virtually only the burning to form clinker is effected. For this reason that fluidized bed furnace may be small so that the radiation of heat can be reduced and less energy required.

The process permits the use of low-grade fuels and does not require a grinding of the starting materials to a very small size. If starting materials are used which result in a so-called "natural" cement (starting materials comprising a homogeneous mixture of the cement-forming ingredients), a grinding to an even larger particle size will be sufficient. If the starting materials have a high alkali content, so that a by-passing is required, less heat will be lost because less gases are withdrawn from the clinkering stage.

BRIEF DESCRIPTION OF DRAWINGS

Referring to the drawings herein:

FIG. 2 is another flow diagram showing another mode for carrying out the invention.

DESCRIPTION OF SPECIFIC EMBODIMENTS

Figure 1:
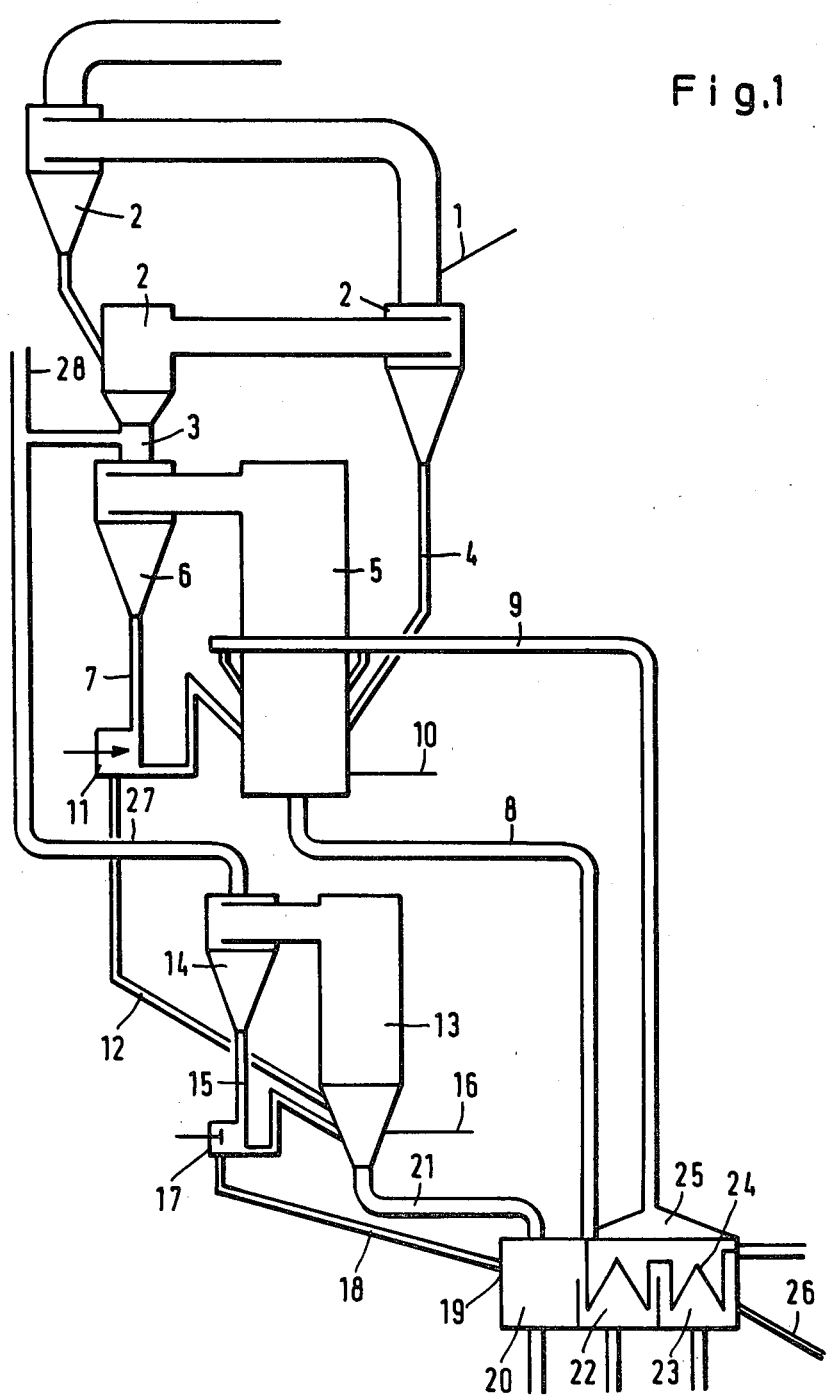
FIG. 1 is a flow diagram showing one mode for carrying out the invention.

Referring to FIG. 1, the raw cement powder is supplied at 1 to the suspension-type heat exchanger 2 (shown in simplified form with two cyclone separators and one venturi reactor) and is preheated by the exhaust gases leaving the circulation system at 3. The preheated cement powder is fed in duct 4 to the circulating system for calcination.

The de-acidifying circulation system comprises the fluidized bed reactor 5, the cyclone separator 6 and the recycling duct 7. The fluidized bed reactor 5 is supplied with fluidizing gas through duct 8 and with secondary gas through duct 9, which suitably consists of an annular duct near the fluidized bed reactor 5. Fuel is charged through a lance 10.

The withdrawing device 11 is controlled by a lance and used to withdraw through duct 12 a continuous stream of solids which is fed to a second circulation system, which also comprises a fluidized bed reactor 13, a cyclone separator 14 and a recycling duct 15. In the second circulation system, the solids are clinkered by being heated by means of fuel which is fed at a relatively low rate through conduit 16.

The clinkering circulation system differs from the first circulation system (5, 6, 7) for de-acidifying the raw cement powder in that the entire oxygen-containing gas required to burn the fuel is desirably supplied at one point in order to produce a peak temperature (hot spot).

After a sufficiently long residence time the cement clinker product is withdrawn by a second withdrawing device 17, controlled by a lance, and supplied through duct 18 to a fluidized bed cooler 19. In the first chamber 20—seen in the direction of flow of the solids—of the cooler 19, the fluidizing air for the fluidized bed reactor 13 is heated and is then withdrawn through duct 21. The subsequent cooling chambers 22 and 23 have interconnected cooling surfaces 24, which extend into the cooling chambers and serve for an indirect heating of the fluidizing air for the fluidized bed reactor 5. The air which has been heated in the cooling chambers 22 and 23 in direct contact with the solids to be cooled is collected in the hood 25 and is fed through duct 9 as secondary air to the fluidized bed reactor 5. The cooled clinker is withdrawn through duct 26.

The exhaust gas from the fluidized bed reactor 13 flows through duct 27 to the suspension-type heat exchanger 2. A partial stream of the exhaust gas or in an extreme case the entire gas stream may be conducted past the suspension-type heat exchanger 2 if this is required. That gas is then cooled in the usual manner in a gas cooler (not shown) and purified.

In accordance with the flow scheme of FIG. 2, the calcine withdrawn from the circulating system (5, 6, 7) through duct 12 is clinkered in an orthodox fluidized bed reactor 29, in which the fluidizing conditions are so selected that a fluidized bed having a defined surface is formed. Fine solids entrained by the gas stream are separated in a cyclone 30 and recycled to the fluidized bed reactor 29 through duct 31.

Clinker is withdrawn from the fluidized bed reactor 29 through the overflow duct 18 and is charged to the structurally separate first cooling chamber 20 of the fluidized bed cooler 19. The cooling air which has been heated up by this cooling flows through duct 21 into the fluidized bed reactor 29. The clinker is then cooled further in the cooling chambers 22 and 23 of the fluidized bed cooler 19. All other units and conduits shown in FIG. 2 correspond to those of FIG. 1 and are designated by the same reference characters.

Example (with reference to FIG. 2)

By means of the feeder 1, the suspension-type heat exchanger 2 was fed at a rate of 3100 kg/h with raw cement powder having a median particle diameter of 30 $\mu$m. The raw cement powder consisted of 2400 kg limestone ($CaCO_3$)
250 kg quartz sand ($SiO_2$)
450 kg clay (high alkali content)

The raw cement powder was preheated to about 950° in the suspension-type heat exchanger 2 by the exhaust gas at 1150° C., which left the de-acidifying circulation system at 3. The raw cement powder was then fed through duct 4 into the fluidized bed reactor 5. The fluidized bed reactor 5 was also fed through duct 10 at a rate of 500 kg/h with coal having a median particle diameter of 200 $\mu$m and a net heating value $H_u$ of 12 MJ/kg through duct 8 at a rate of 560 $m_N^3$/h with fluidizing gas at 450° C. and through duct 9 at a rate of 1320 $m_N^3$/h with secondary gas at 710° C.

A temperature of 1150° C. was obtained in the circulation system comprising the fluidized bed reactor 5, the cyclone separator 6 and the recycling duct 7. As a result of the rates and proportion of the gas streams, the mean suspension density in the fluidized bed reactor 5 amounted to 150 kg/m$^3$ below the secondary gas inlet 9 and to 10 kg/m$^3$ above the secondary gas inlet 9. In the circulation system, the cement powder had a residence time of about 8 minutes and was subjected to a de-acidification of about 99.2%.

Calcined cement powder at a rate of 2000 kg/h was withdrawn by means of the withdrawing device 11 and was fed through duct 12 to the fluidized bed reactor 29. The fluidized bed reactor 29 was also supplied through lance 16 at a rate of 18.5 kg/h with coal having a particle size of 20% > 90 μm and a net heating value $H_u$ of 25 MJ/kg and through duct 21 with air at a rate of 132 $m_N^3$/h. That air had been heated to 1280° C. in the cooling chamber 20 of the fluidized bed cooler 19. The temperature in the fluidized bed reactor 29 amounted to 1400° C. In the bed of the fluidized bed reactor 29 the suspension density amounted to 200 kg/m$^3$, the fluidizing gas velocity (in the empty reactor) amounted to 2 m/sec, and the median particle diameter amounted to 300 μm.

The clinker 18 was then fed through duct 18 into the first cooling chamber 20 of the fluidized bed cooler 19 and was cooled there with fluidizing gas at a rate of 132 $m_N/^3$h; which was thus heated to 1280° C. As described hereinbefore, the air was fed through duct 21 to the fluidized bed reactor 29.

The further cooling was effected in the cooling chambers 22 and 23 of the fluidized bed cooler 19 in the direct contact with fluidizing air at a rate of 1320 $m_N^3$/h and as an indirect cooling by cooling air at a rate of 560 $m_N^3$/h, which was conducted through the cooling surfaces 24. As a result, the respective air streams were heated to 710° C. and 450° C. and were then supplied through duct 9 as secondary air and through duct 8 as fluidizing air to the fluidized bed reactor 5. 2000 kg clinker were produced per hour.

Owing to its high alkali content, the entire exhaust gas leaving the fluidized bed reactor 29 was conducted in duct 28 past the suspension-type heat exchanger 2 and was cooled and purified.

What is claimed is:

1. In a process of producing cement clinker comprising preheating the raw cement powder in a suspension-type heat exchanger, de-acidifying in a precalcining system, clinkering in a fluidized bed, and subsequently cooling the clinker, the improvement comprising
    (A) de-acidifying said raw cement powder at a temperature above 850° C. to a degree of at least 95% in a de-acidification circulation system comprising a de-acidification fluidized bed reactor, a cyclone separator and a recycling duct;
    (B) feeding at least 65% relative to the total heat requirement, of the fuel required for the calcining and clinkering processes to the de-acidifying fluidized bed reactor and at least 10%, related to the total heat requirement, to the clinkering fluidized bed reactor;
    (C) near stoichiometrically burning the fuel supplied to the de-acidifying fluidized bed reactor in at least two combustion stages with at least two partial streams of oxygen-containing gas, one of said stream being supplied as fluidizing gas and the other being supplied on a higher level as secondary gas, the ratio of the rates and volumes of fluidizing gas to secondary gas being maintained in the range from 1:1 to 1:10 so that a mean suspension density of 100 to 300 kg/m$^3$ is maintained in the zone between the inlet for fluidizing gas and the inlet for secondary gas; and
    (D) maintaining a mean suspension density of 5 to 30 kg/m$^3$ above the inlet for secondary gas.

2. A process according to claim 1, wherein the de-acidifying fluidized bed reactor is supplied with 70 to 85%, related to the total heat requirement, of the fuel required for the calcining and clinkering processes and the clinkering fluidized bed reactor is supplied with 15 to 30%, related to the total heat requirement, of said fuel.

3. A process according to claim 1, wherein the residence time of the solids in the de-acidifying circulation system amounts to 3 to 15 minutes.

4. A process according to claim 1, wherein a temperature in the range of 950° to 1150° C. is maintained in the de-acidifying circulation system.

5. A process according to claim 1, wherein solid carbonaceous fuels are used which have a median particle diameter $d_p$ 50 below 500 μm.

6. A process according to claim 1, wherein clinkering is effected in a circulation system comprising a fluidized bed reactor, a cyclone separator and a recycling duct.

7. A process according to claim 1, wherein the cooling of the clinker is combined with the heating of oxygen-containing gas, at least part of which is supplied to the calcining and clinkering processes.

8. A process according to claim 7, wherein the clinker is cooled with an oxygen-containing gas, which is thus heated by direct contact and indirectly.

9. A process according to claim 7, wherein the clinker is cooled in a fluidized bed cooler.

10. A process according to claim 9, wherein an oxygen-containing gas which has been heated in a first cooling chamber of the fluidized bed cooler in direct contact with solids to be cooled is supplied as fluidizing gas to the fluidized bed reactor of the clinkering stage.

* * * * *